US007636732B1

(12) United States Patent (10) Patent No.: US 7,636,732 B1
Nielsen (45) Date of Patent: Dec. 22, 2009

(54) ADAPTIVE META-TAGGING OF WEBSITES

(75) Inventor: Jakob Nielsen, Atherton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1080 days.

(21) Appl. No.: 08/865,841

(22) Filed: May 30, 1997

(51) Int. Cl.
*G06F 17/30* (2006.01)
(52) U.S. Cl. ............... 707/104.1; 707/102; 709/217
(58) Field of Classification Search ............ 707/1–205; 345/841
See application file for complete search history.

(56) References Cited

U.S. PATENT DOCUMENTS

| 4,879,648 | A | * | 11/1989 | Cochran et al. | 345/841 |
| 5,206,949 | A | * | 4/1993 | Cochran et al. | 707/4 |
| 5,550,971 | A | * | 8/1996 | Brunner et al. | 395/603 |
| 5,574,898 | A | * | 11/1996 | Leblang et al. | 395/601 |
| 5,590,319 | A | * | 12/1996 | Cohen et al. | 707/4 |
| 5,768,581 | A | * | 6/1998 | Cochran | 707/5 |
| 5,956,711 | A | * | 9/1999 | Sullivan et al. | 707/6 |
| 5,995,979 | A | * | 11/1999 | Cochran | 707/104.1 |

* cited by examiner

*Primary Examiner*—Shahid A Alam
(74) *Attorney, Agent, or Firm*—Sonnenschein Nath & Rosenthal LLP

(57) ABSTRACT

Search queries to a search engine are collected over a period of time and used as a source of terms for selectively adding to documents. The terms may be added as meta-tags for enhancing information retrieval. Also, candidate terms may be submitted to the search engine and the most relevant documents retrieved. These documents, or portions thereof, are reviewed to determine if the content is substantially related to the term. If it is, the term is added to the document as a meta-tag and the search engine index is updated to reflect the addition. Employing this invention, search engine results will adapt to changes in usage of search terms.

23 Claims, 14 Drawing Sheets

ADAPTIVE META-TAGGING OF WEBSITES

BACKGROUND OF THE INVENTION

1. Field of the Invention

The invention relates to information retrieval systems and particularly to an adaptive meta-tagging of documents in information retrieval systems located on network servers such as found in the World Wide Web.

2. Description of Related Art

Meta-information is information about information. Some documents or files contain sections which contain meta-information related to the contents of that document or file. An example of meta-information is a keyword list. A meta-tag is an entry in a meta-information section of a document or file.

Web search services like InfoSeek and AltaVista are better at finding the correct webpages if the pages are encoded with meta-tags specifying keywords that users want to use to find the pages in question. Unfortunately, page authors are rarely capable of predicting all the search terms users want to use in searching for the information. For example, the page for a product known as "Workshop for C" would not be found by a user entering the search phrase "C compiler" unless the page author has remembered to add the term "compiler" as a keyword in a meta-tag for the page. It is empirically true that page authors often forget to do so. The need for help in meta-tagging is particularly acute due to the verbal disagreement phenomenon which is that different people often use different terms to describe the same thing. Thus, even if the page author remembers to enter meta-tagged keywords, the author may still leave out a search term used by some users because the author simply didn't think of this term.

Some search engines attempt to compensate for poor keyword tagging by the use of synonym searches. For example, the Excite search engine has a so-called concept search that is claimed to be able to find pages even if the user's query term does not appear on the page. This method has the obvious weakness that it only helps those users who use a search engine that implement synonym searches. Furthermore, the general Internet search engines have to rely on general synonym dictionaries that are not optimized for the domain of any specific website.

The Problems

Most information retrieval systems use indexing which is static, that is, once a document is indexed, its indexing doesn't change. Since language changes, it would be desirable to permit indexing to evolve in the same way.

It would be desirable to enhance the relevance of documents or files retrieved in response to search queries.

SUMMARY OF THE INVENTION

The invention overcomes problems of the prior art addressed above by utilizing a website's own search engine as a source of possible keyword terms for meta-tagging documents on the website.

The invention relates to computer apparatus and systems for information retrieval, provide a list of terms used in search queries presented over a period of time to be selectively added to information stored in information storage. The terms may be added as meta-tags to the information stored and an inverted index is updated to reflect the meta-tag.

The invention also relates to methods of using search terms used in queries over a period of time for locating documents or files in an information retrieval system to which such terms may be added as meta-tags. All documents or files are processed for meta-tagging during an initial pass and then only those which have been created or updates since the initial pass need to be processed subsequently.

The invention also relates to presenting to a user suggested terms for indexing a document the user created using search terms collected over a period of use of a search engine.

The invention also relates to computer program products for carrying out the techniques of the invention.

The foregoing and other features, aspects and advantages of the present invention will become more apparent from the following detailed description of the present invention when taken in conjunction with the accompanying drawings.

BRIEF DESCRIPTION OF THE DRAWINGS

The objects, features and advantages of the system of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENTS

Figure 1A:
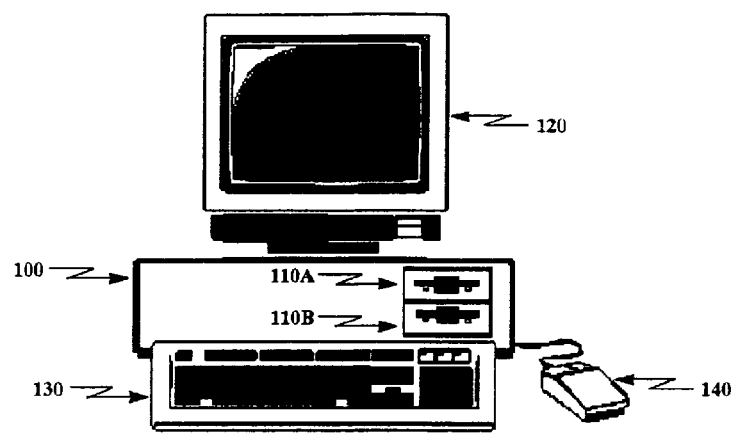
FIG. 1A illustrates a computer of a type suitable for carrying out the invention.

FIG. 1A illustrates a computer of a type suitable for carrying out the invention. It is typically configured as a network server, particularly the type of network server which can be utilized as part of the World Wide Web. Viewed externally in FIG. 1A, a computer system has a central processing unit 100 having disk drives 110A and 110B. Disk drive indications 110A and 110B are merely symbolic of a number of disk drives which might be accommodated by the computer system. Typically, these would include a floppy disk drive such as 110A, a hard disk drive (not shown externally) and a CD ROM drive indicated by slot 110B. The number and type of drives varies, typically, with different computer configurations. The computer has the display 120 upon which information is displayed. A keyboard 130 and a mouse 140 are typically also available as input devices. Preferably, the computer illustrated in FIG. 1A is a SPARC workstation from Sun Microsystems, Inc.

Figure 1B:
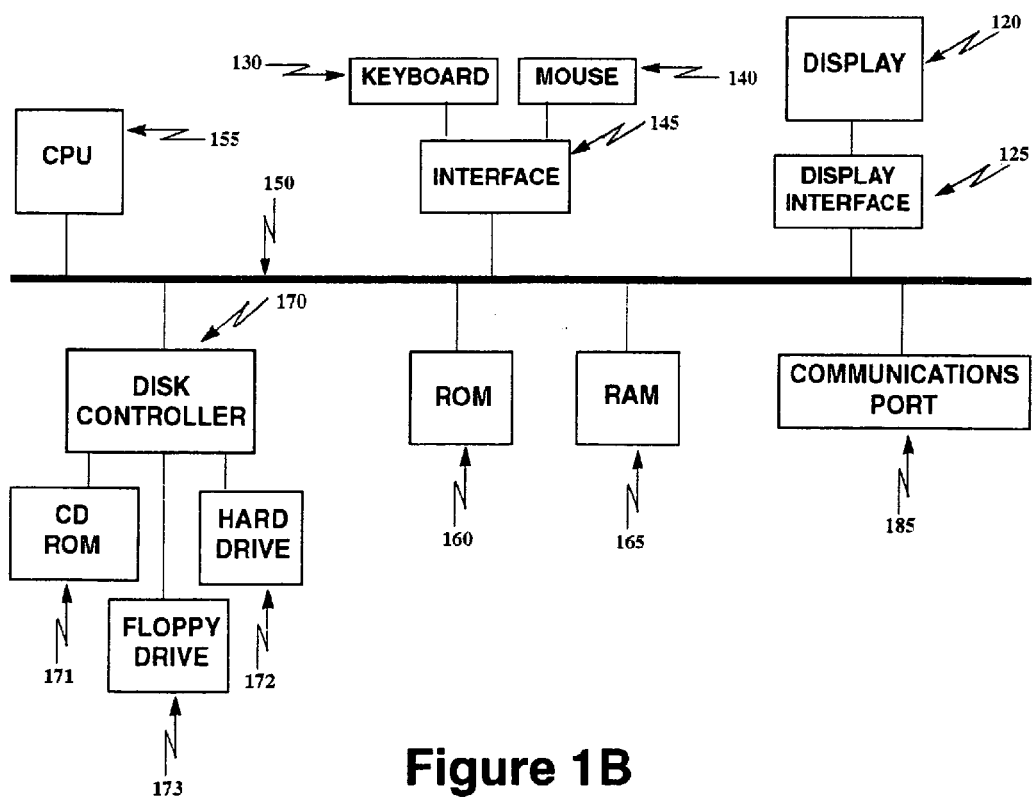
FIG. 1B illustrates a block diagram of the computer of FIG. 1A.

FIG. 1B illustrates a block diagram of the internal hardware of the computer of FIG. 1A. A bus 150 serves as the main information highway interconnecting the other components of the computer. CPU 155 is the central processing unit of the system, performing calculations and logic operations required to execute programs. Read only memory (160) and random access memory (165) constitute the main memory of the computer. Disk controller 170 interfaces one or more disk drives to the system bus 150. These disk drives may be floppy disk drives, such as 173, internal or external hard drives, such as 172, or CD ROM or DVD (Digital Video Disks) drives such as 171. A display interface 175 interfaces a display 120 and permits information from the bus to be viewed on the display. Communications with external devices can occur over communications port 185.

Figure 1C:
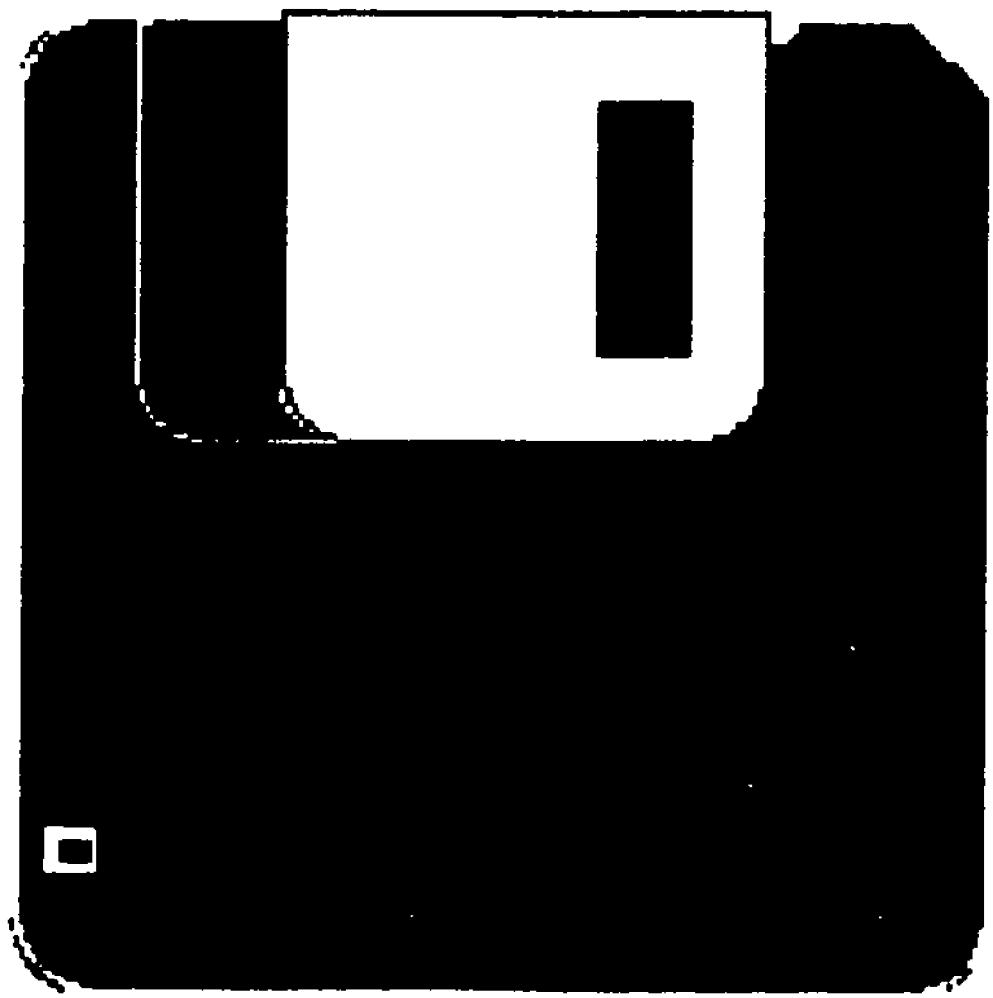
FIG. 1C illustrates an exemplary memory medium containing one or more programs and data useable with the computer of FIG. 1A.

FIG. 1C illustrates an exemplary memory medium which can be used with drives such as 173 in FIG. 1B or 110A in FIG. 1A. Typically, memory media such as a floppy disk, or a CD ROM, or a Digital Video Disk will contain the program information and data for controlling the computer to enable the computer to perform its functions in accordance with the invention.

Figure 2:
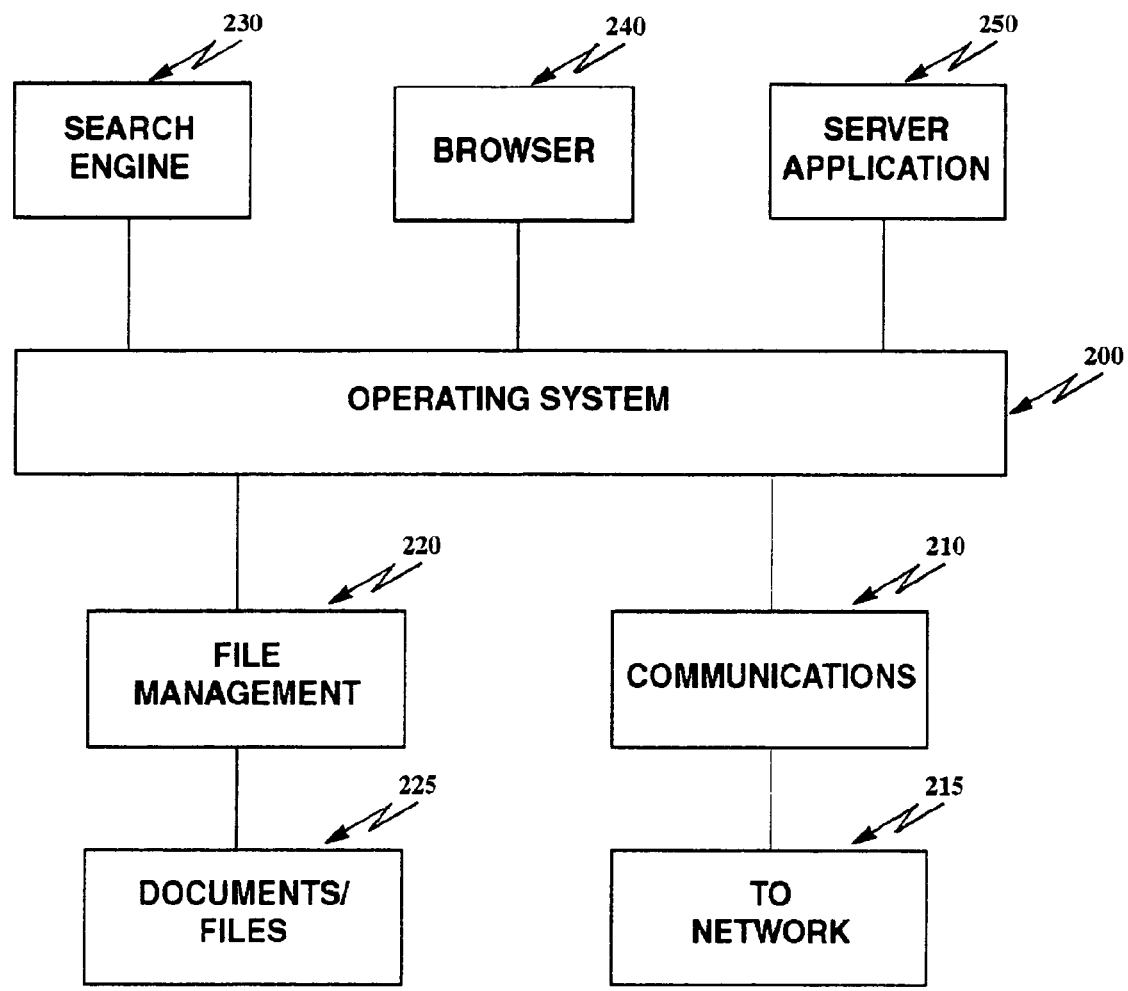
FIG. 2 is a block diagram of an exemplary software architecture for the computer as shown in FIG. 1.

FIG. 2 is a block diagram of an exemplary software architecture for the computers shown in FIGS. 1A and 1B. Typically, an operating system 200 will operate to provide certain basic computer functionality to application level programs. The operating system typically manages communications (210) to be sent to and received from a network (215). The operating system also typically controls a file management system 220 which provides access to documents and files (225). When configured as a server, there will be a server application 250 which will provide the basic server functionality required to service client requests. Typically, when configured as a server, there will be a search engine process for permitting full text search queries against the documents and files (225) managed by the file management system 220. As shown in FIG. 2, a browser 240 is available for viewing files and documents available on the network.

Figure 3:
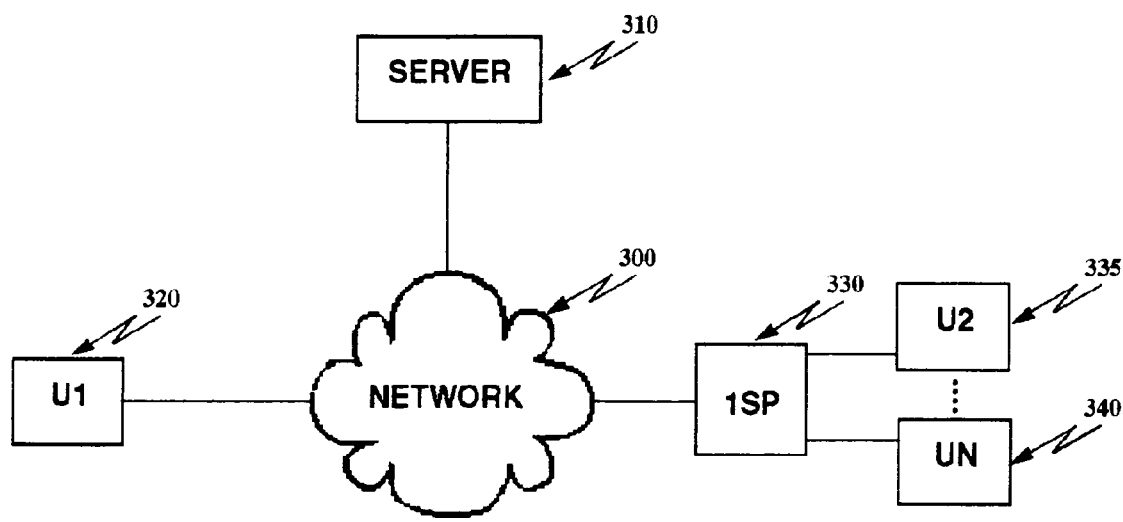
FIG. 3 is a block diagram of a communications system connecting users and servers over a network.

FIG. 3 is a block diagram of a communications system connecting users and servers over a network. A network 300 provides an interconnection fabric for linking an exemplary server 310 with users 320, 335 and 340. Users 335 and 340 are connected to the network using an internet service provider (ISP) 330. Server 310 may preferably be a computer of the type described in conjunction with FIGS. 1A, 1B and 2.

Figure 4:
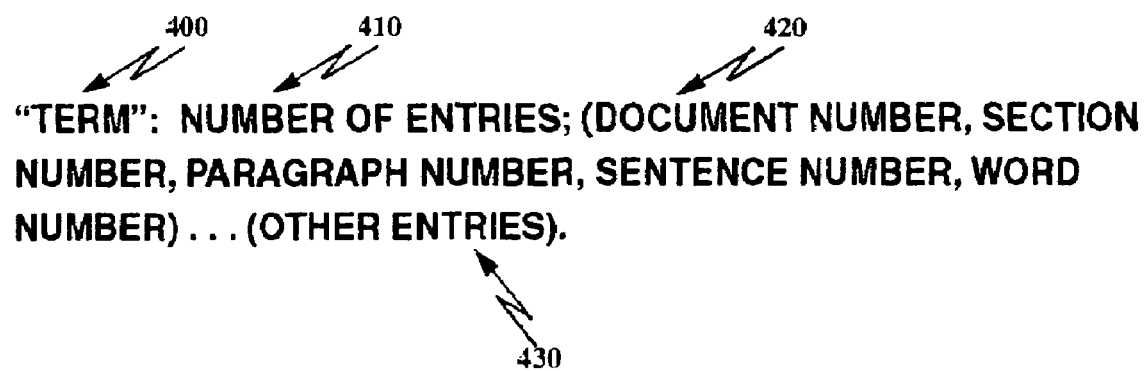
FIG. 4 is an illustration of an exemplary entry in an inverted index used for full text search.

FIG. 4 is an illustration of an exemplary entry in an inverted index used for full text search. An inverted index is generated from a collection of text documents. Each word in each document is examined. If a word is a term which already exists in an inverted index entry, the location of the term is added to that entry specifying where the term is located within the universe of documents. FIG. 4 shows an exemplary layout of a single entry for an inverted index. A typical inverted index entry identifies a term 400 and a number of entries 410 indicating the number of times that term appears in the collection or universe of documents. A plurality (typically) of entries 420 and 430 specify the location of every occurrence of that term within the universe of documents.

When a typical search query is submitted, a number of terms will be linked by Boolean operators to specify the search query desired. The entry of the inverted index for each term is accessed, when a query is submitted and, commonly, the number of entries (410) for a particular term is displayed while the search query is ongoing. Thus, if one were looking for the search query "DOGS AND CATS", then the inverted index would first be consulted for the entries relating to the word "DOGS" and it would also locate the entry for the term "CATS." Once these two entries have been found, the entries specifying where the terms are located within the document universe are compared to find only those documents having both terms present.

Figure 5:
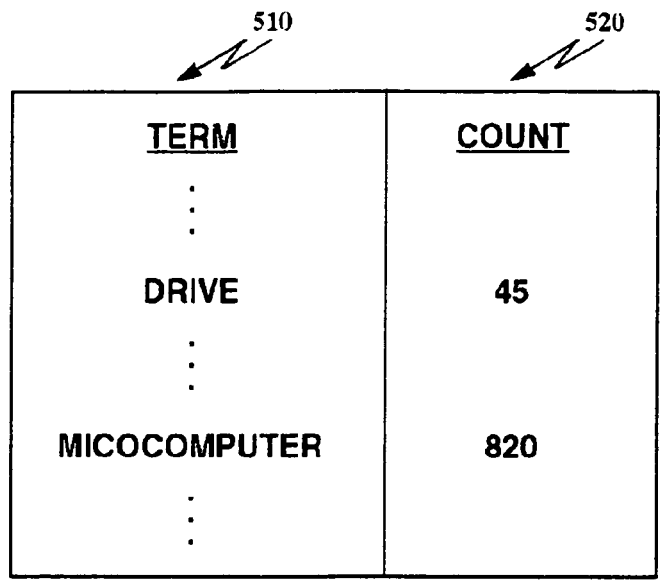
FIG. 5 is a representation of a master term database used in accordance with the invention.

FIG. 5 is a representation of a master term database used in accordance with the invention. There are essentially two columns in this database. The first, 510 contains a list of terms. The second column contains a count of the number of times that the corresponding term was submitted in queries to the search engine over a period of time. How these counts are determined is discussed more hereinafter.

Figure 6:
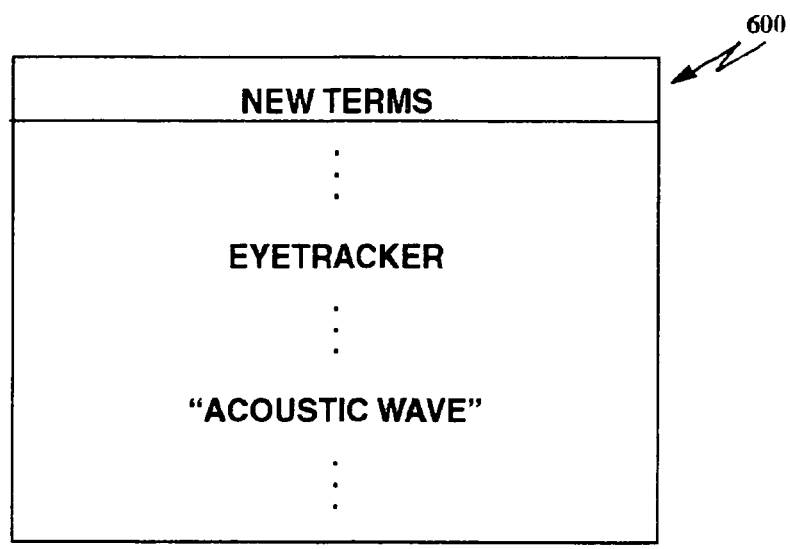
FIG. 6 is a representation of a new terms database used in accordance with the invention.

FIG. 6 is a representation of a new terms database used in accordance with the invention. A single column 600 is used to contain terms from the query list which were not previously in the master term list. This too, will be discussed more hereinafter.

Figure 7:
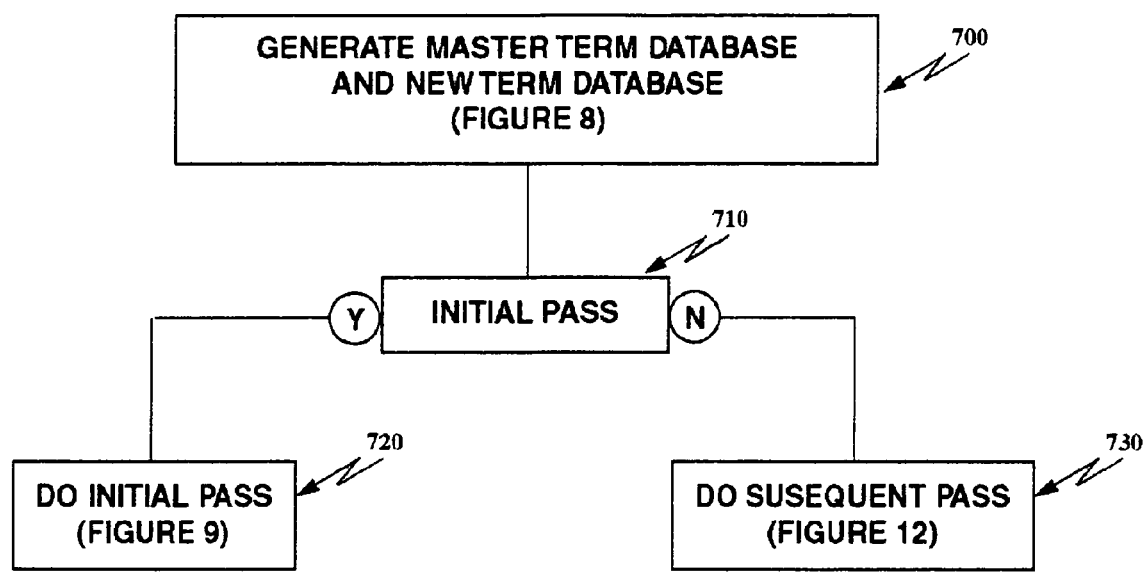
FIG. 7 is a high level flowchart of how processes interact in accordance with the invention.

FIG. 7 is a high level flowchart of how processes interact in accordance with the invention. A brief overview of how the invention works at a high level should facilitate an understanding of the remaining description of the invention.

Using prior art, the existing search engine on the website collects a log file of all the queries entered by users. The present invention takes such a log file as its starting point after the log has accumulated queries for some period of time (preferably one month).

The first time the invention is used for a website, it is applied to all files on the site. During subsequent runs, it is only applied to those files that have been added to the site or that have been modified since the last run. The recommended time between each run of the adaptive meta-tagging process is the time needed to accumulate a new log file of query terms entered by users (again, preferably one month). The reason for repeated runs of the adaptive meta-tagging is that the vocabulary that best describes new phenomena may be new or may have changed compared to the vocabulary used by users in the past.

The log file of users' query terms is sorted alphabetically, duplicate entries are counted, the count is noted with the first occurrence of each term, and the duplicates are removed. Duplicate entries indicate that the same term was used in multiple queries, so that could indicates how often the term was used. Terms without any duplicates are assigned a count of 1. Preferably all duplicates are treated equally, but it is possible to only count duplicates received from different Internet hosts if the search engine log recorded not just query terms but also the IP address from which they were received. This refinement would account for the number of different users who used each term instead of the (recommended) simpler count of the number of times each term was used no matter whether it was used many times by a few users or a smaller number of times by many users.

The set of unique query terms is then sorted by the frequency count. The most frequently used N % of the terms are saved and the rest are discarded. N is a preference setting with a recommended value of 25. The reasons to discard a recommended 75% of the query terms is that they are less frequently used query terms and are therefore unlikely to be representative of the users (for example, they will include many terms entered by mistake) and that it is desirable not to add too many keywords to the webpages since many search engines give less weight to each keyword if multiple keywords are present.

The remaining query terms are then added to the webpages that are being considered, preferably as meta-tags. Since the goal is to enhance the quality of retrieved pages, the recommended way to add query terms is by manual consideration, through an automated method would be a possibility.

Figure 8:
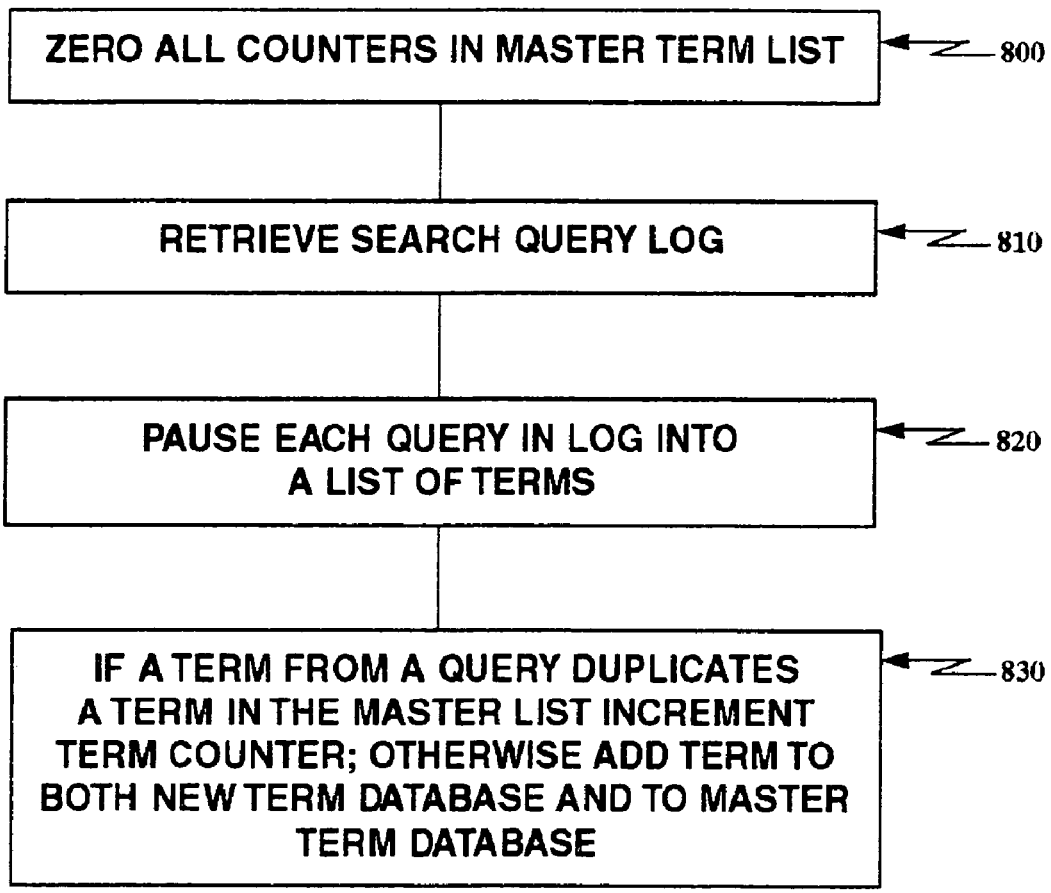
FIG. 8 is a flowchart of a process used to create a master term data base and a new term data base.

Against that background, master term databases and new term databases are generated (700) as described in detail in FIG. 8. A determination is made (710) whether this is the first time that files have been processed by the invention. Typically, this can be determined because the master term list will have no entries. If it is the initial pass, the initial pass process described in conjunction with FIG. 9 (720) will be pursued. If an initial pass had previously occurred (710-N) a subsequent pass process described in FIG. 12 will be undertaken (730).

FIG. 8 is a flowchart of a process used to generate a master term database and a new term database. Initially, all counters in the master term list are initialized to a zero value (800). The search query log maintained by the search engine is retrieved (810) and each query in the log is parsed into a list of terms (820). If a term from a query duplicates a term in the master term database shown in FIG. 5, the term counter for the term of the term database is incremented. Otherwise, the term would be added to both the new term database and to the master term database (830).

Figure 9:
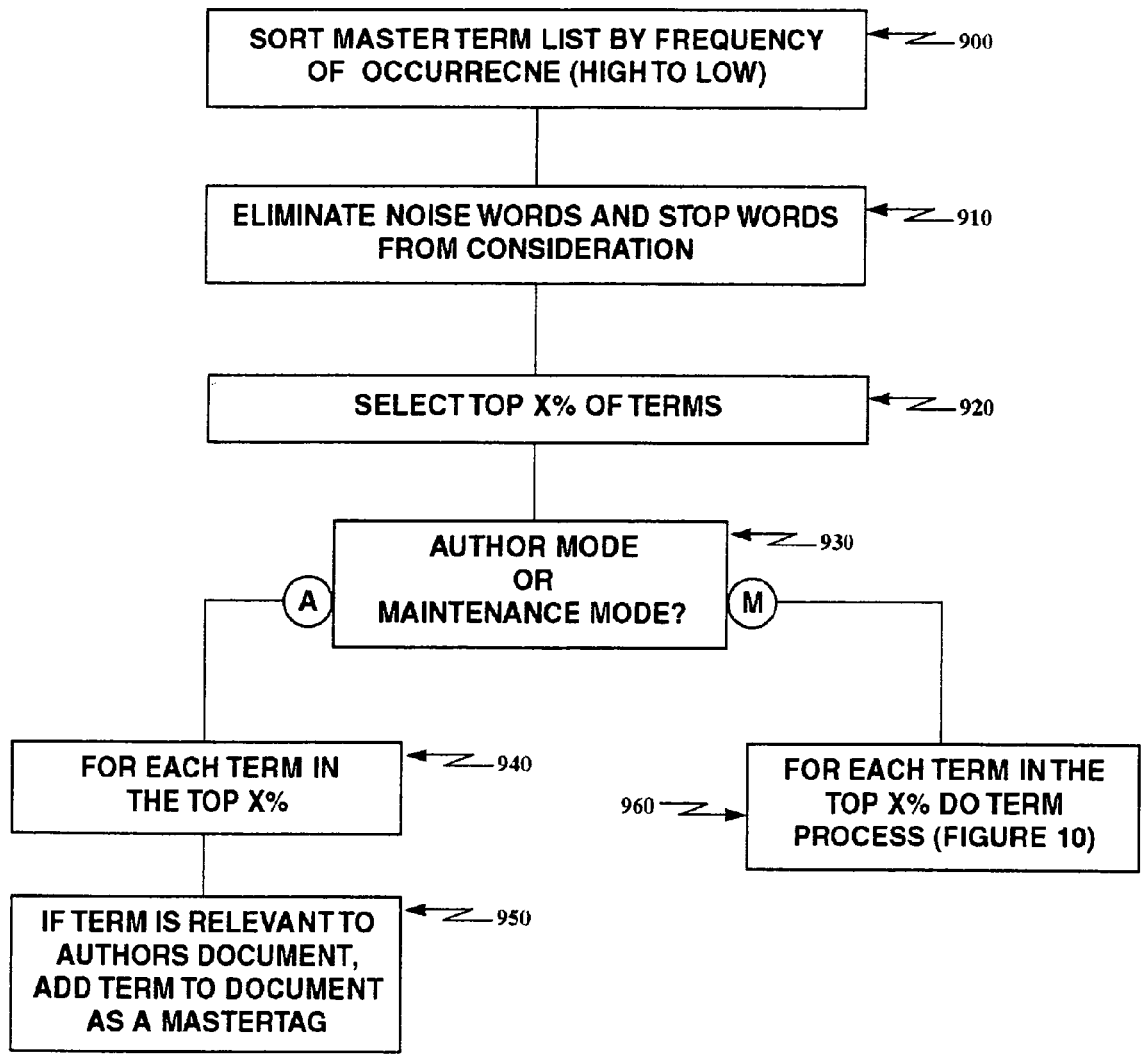
FIG. 9 is a flowchart of a process used during an initial pass at files on a server and a way an author could obtain help in indexing his document.

FIG. 9 is a flowchart of a process used during an initial pass at files on a server as well as a way in which an author can utilize the invention to help index his documents. The master term database is sorted by frequency of occurrence, based on the value of the term counter so that the most frequently requested terms would be listed at the top of the list (900). Noise words and stop words are eliminated from consideration (910). The top X percentage of terms are then selected for further processing (920). In the preferred embodiment of the invention, the value of X percent is 25%. Having made the selection, a determination is made whether or not an author mode or a maintenance mode is selected.

In an author mode, an author of a document stored on the server may be interested in help in providing proper index terms for the document. Pursuing branch 930-A describes that mode. Branch 930-M describes the maintenance mode or the mode most commonly utilized to ensure that all documents on the server are properly indexed.

Turning to branch 930-A, when an author desires to index his own document, the steps of 900, 910, 920 and 930A are followed. The author will then consider each term in the top X percent of the database (940) and if the term is relevant to the author's document, that term will be added to the document as a meta-tag as described more hereinafter.

Figure 10A:
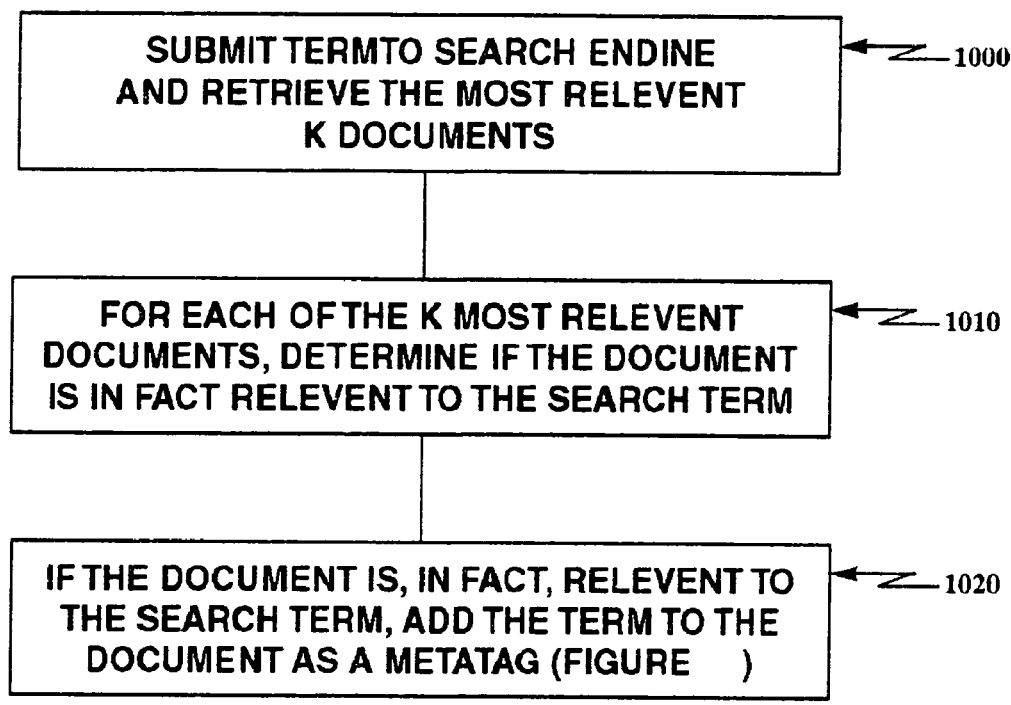
FIG. 10A is a flowchart of a process for processing new terms in accordance with the invention.

In the maintenance mode, for each term in the top X percent of the master term database, the term process method illustrated in FIG. 10A will be undertaken.

FIG. 10A is a flowchart of a process for processing new terms in accordance with the invention. A partially automated method for determining whether a document should be supplemented with additional terms in the meta-tag field, is described as follows. For each remaining query term (starting from the top with the most frequently used term), the system performs a search using the search engine on the server and selects the top K hits that are within the set of files being considered. K is a configuration setting with the recommended value of 10. The search engine is preferably configured to rank documents which contain the term in question in accordance with relevance considerations. Such techniques are well known in the information retrieval art. In one form, certain sections of the document are considered to be more important than other sections of the document. Meta-tag sections are considered more important. Thus, when a search term is included within the high priority sections, documents are presumed to be more relevant than a document which would contain the same term in a less favorite section. This is described more in FIG. 10A. The search term being considered is submitted to the search engine as if it were a new request (1000) and the most relevant K documents are retrieved. The preferred value for K is 10. For each of the K most relevant documents, they are displayed, at least partially, to determine if the document is in fact relevant to the search term (1010). If the document is, in fact, relevant to the search term, the term will be added to the document as a meta-tag (1020) using the process described in conjunction with FIG. 11.

Figure 10B:
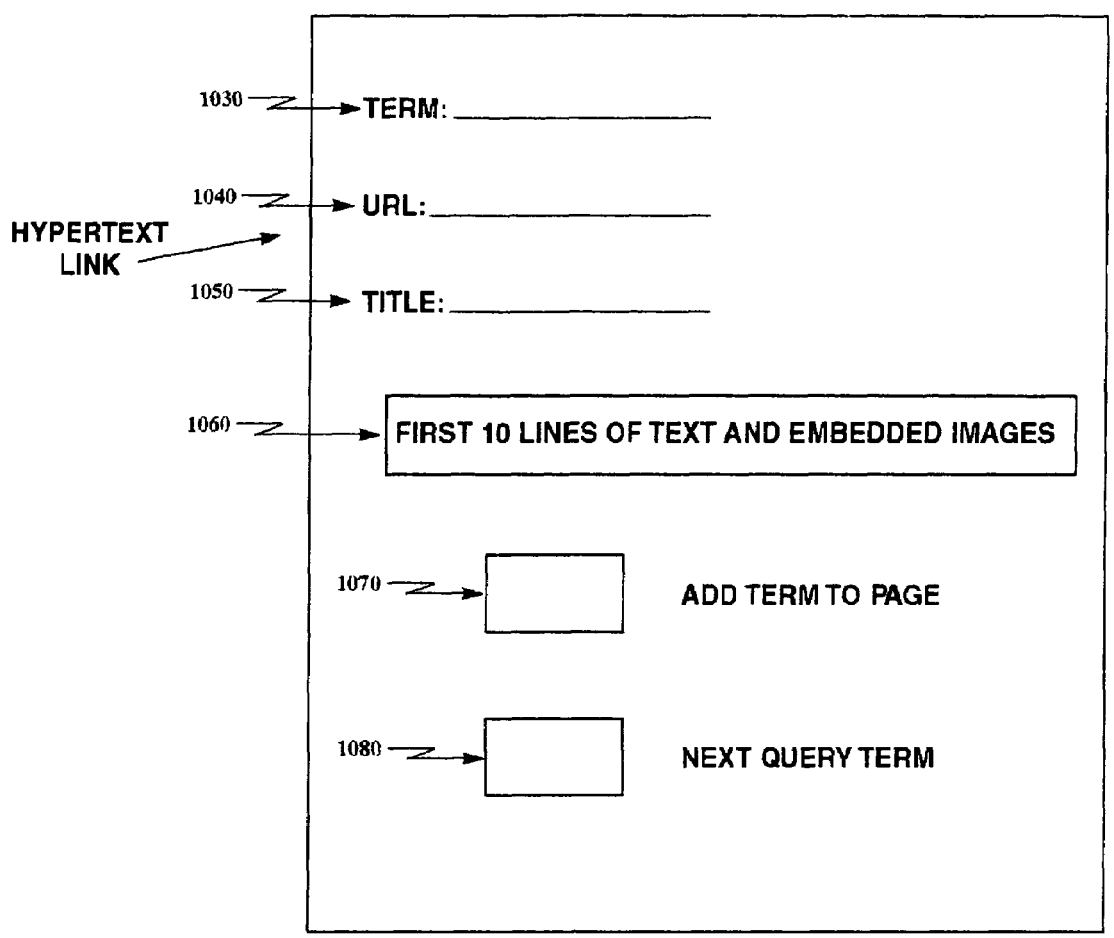
FIG. 10B is a representation of an exemplary browser screen used in accordance with the invention.

FIG. 10B is a representation of an exemplary graphical user interface of a browser screen used in accordance with the invention.

When the first K documents are retrieved for a particular term, the screen shown in FIG. 10B is preferably displayed, serially, for each of the K documents to be considered. At the top, the term (1030) being considered is listed. The network address 1040 is also listed. Preferably, the network address is a URL designed to facilitate identification of documents on the World Wide Web although that is not necessary. The listed URL is preferably displayed as a hypertext link so that a user considering the document can obtain the full text of the document if desired. The title 1050 is also listed as well as the first ten lines of text (1060) together with any embedded images within those ten lines of text.

A button 1070 is displayed and can be activated by a mouse click to add the term 1030 to the page specified by the URL 1040 as a meta-tag. Once that has been done, the next query term may be selected, assuming there is one by activating button 1080. If there is not one, a display such as "last query term" may be shown to the user.

Figure 11:
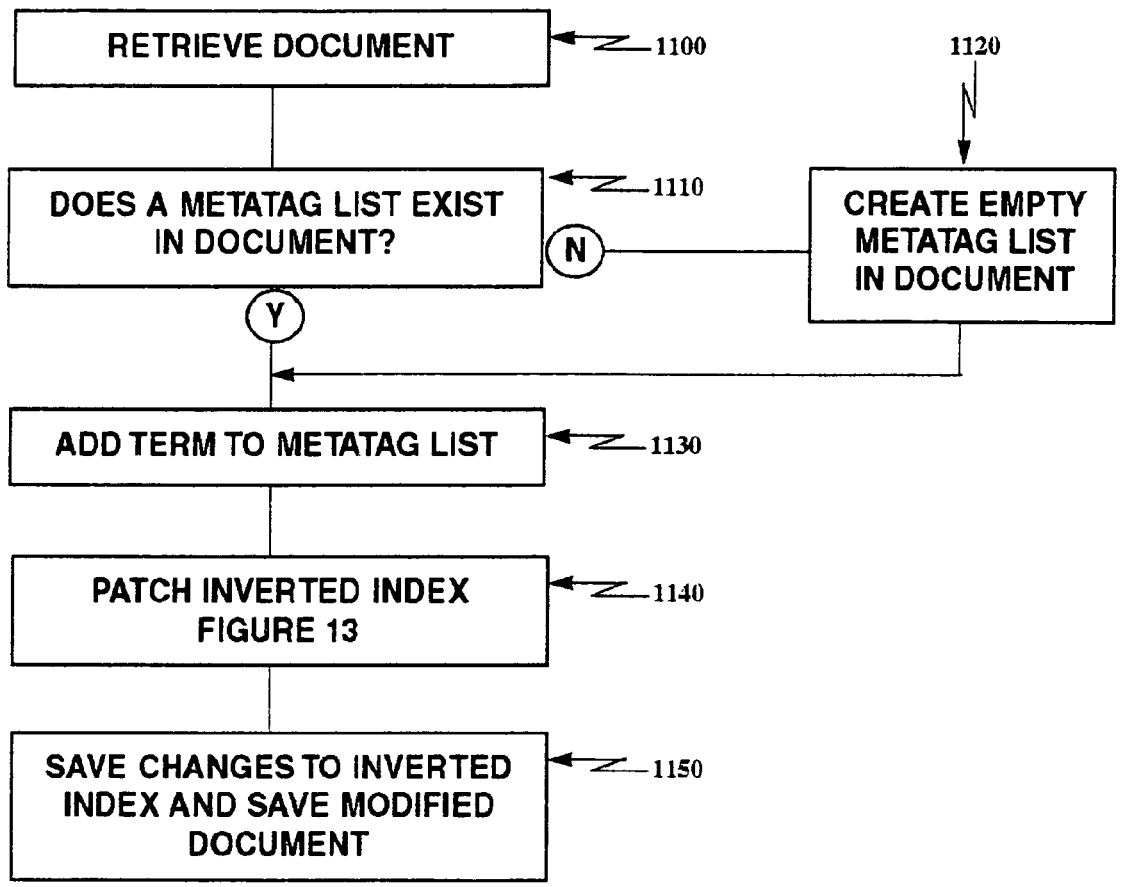
FIG. 11 is a flowchart of a process used for adding a term to a document as a meta-tag.

FIG. 11 is a flowchart of a process used for adding a term to a document as a meta-tag. The document is retrieved (1100) and a check is made to determine whether the document contains a meta-tag list within the document itself. If it does, the term is added into that meta-tag list (1130). If it does not, (1110-N) an empty meta-tag list is created in the document (1120) and then the term is added to the meta-tag list (1130). Since it is preferable not to have to re-index the entire set of files and documents merely to obtain entries for the changes resulting from the meta-tagging of a document, a meta-tag is inserted into the inverted index (1140) using the process shown in FIG. 13.

The changes to the inverted index and the modified document are then stored for later retrieval (1150).

Figure 12:
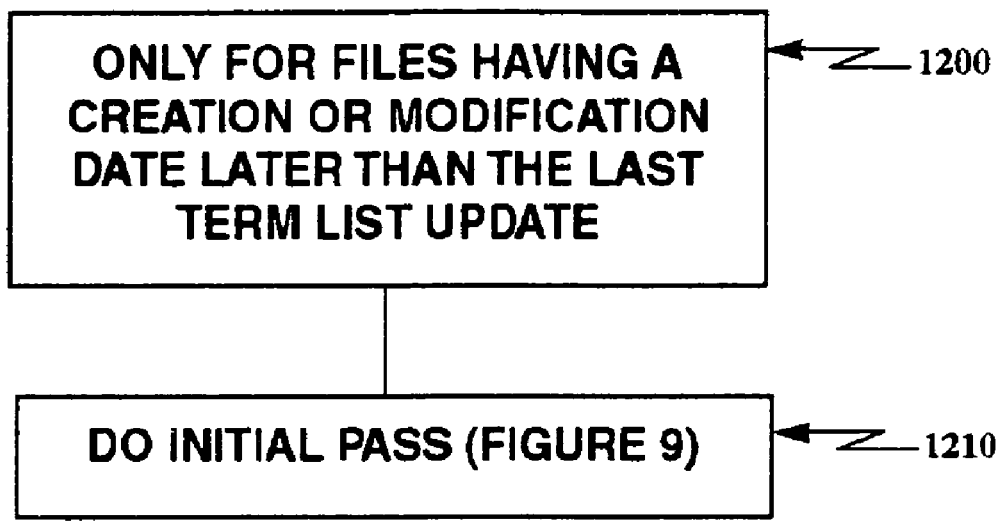
FIG. 12 is a flowchart of a process used after an initial pass against all files of a server.

FIG. 12 is a flowchart of a process used after an initial pass against all files of a server. Once all files of a server have been considered for meta-tagging given the term lists and as discussed above, the problem arises that one must handle newly created files, e.g., files newly added to the server or files which have been modified which possibly may include new textural material. After an initial pass has been made across the files and documents of the server, it is only necessary to do the new and modified files which have been created at a date later than the last term list update (1200). By limiting the scope of the documents considered, the same initial pass process described in conjunction with FIG. 9 can be applied to the new and modified files (1210) to update the server to a current condition.

Figure 13:
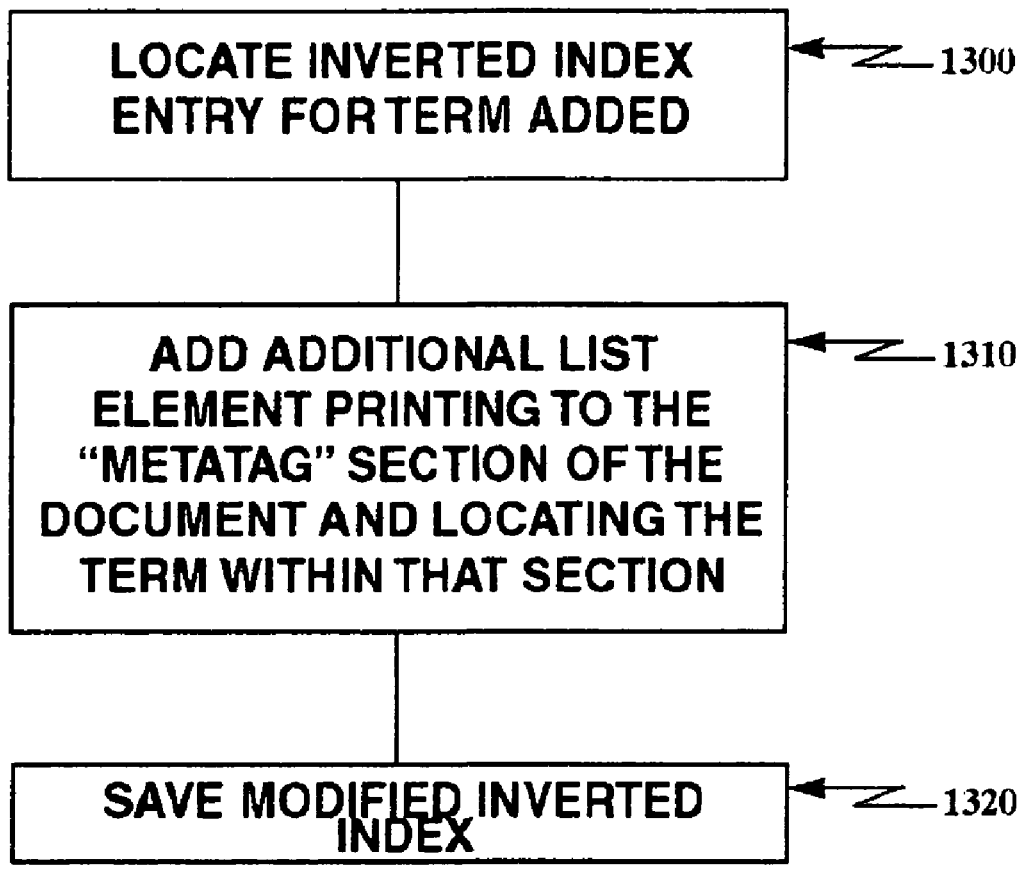
FIG. 13 is a flowchart of a process used for updating or patching an inverted index.

FIG. 13 is a flowchart of a process used for updating or patching an inverted index. The inverted index entry for the term which has been added as a meta-tag to the document is located (1300) and an additional list element pointing to the meta-tagging section of the document and locating the term within that section is added to the inverted index entry (1310) and a modified inverted index is saved (1320).

By utilizing the terms from the search queries submitted to the search engine, one can improve the prospect of retrieving more relevant documents, since typically, meta-tagging sections have a higher priority than other sections in a full text search. A number of advantages accrue from doing this. First, the probability of retrieving relevant information is enhanced because a human has determined that that term is relevant to a document which contains it as a meta-tag. This therefore tends to concentrate the more relevant documents or files near the top of the retrieval list in terms of relevance ranking.

A second benefit is achieved in that as language evolves with new terms, these can be captured and incorporated as meta-tags in the documents in order to retrieve the documents that are important to the that new term. This is particularly important in the early stages of a technological change when the terminology is not stabilized. As a result, many old documents do not use the current "buzz word" to describe a technology since the buzz word develops long after the technology does. However, if a human were to identify a document as being relevant to that term using the techniques described herein, even the very early documents in the evolution of a particular technology could be identified and retrieved using a search term which did not come in to existence until long after the document had been created. This also permits a web site to optimize retrieval for the subject matter domain in which it specializes.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A web server for information retrieval, comprising:
   a. a bus;
   b. information storage accessible through the bus and containing stored information;
   c. a network interface connected to the bus; and
   d. a processor connected to said bus, said processor configured to receive non-predetermined search queries submitted by a client over said network interface, to process the search queries against the stored information, and to provide a list of terms used in the search queries presented over a period of time, wherein the list of terms are selectively added to the stored information against which the search queries are processed.

2. The web server of claim 1 in which a term to be selectively added is added to a document or file as a meta-tag.

3. The web server of claim 2 in which a term to be selectively added is also added to an inverted index.

4. A method of enhancing information retrieval in an information retrieval system, comprising:
   a. storing a list of non-predetermined queries received from a client to a search engine on a website;
   b. storing a list of search terms used in the queries together with frequency of occurrence of the search terms;
   c. selecting at least a portion of relatively high frequency search terms; and
   d. processing each search term of the portion and selectively adding each search term to documents or files stored in the system as a meta-tag.

5. The method of claim 4 in which processing each term of said portion comprises presenting the term to a user together with at least identifiers of a number of documents or files stored in said system containing said term.

6. The method of claim 5 in which said processing includes presenting the term to a user together with at least portions of a document identified by one of said identifiers.

7. The method of claim 6 in which said term is presented to a user with portions of a document in a graphical user interface having a user activatable function for adding a term to said document as a meta-tag.

8. The method of claim 4 further comprising the step of providing an element for selectively adding said term to said document as a meta-tag.

9. The method of claim 8 further comprising the step of providing an element for adding information about the term added to said document as a meta-tag in an inverted index.

10. A method of enhancing information retrieval in an information retrieval system, comprising:
    a. storing a list of non-predetermined terms used in queries received from a client;
    b. storing, with the list, a frequency of occurrence of the terms; and
    c. adding at least one term selected from the list based on frequency of occurrence to at least one document to be searched containing the term as a meta-tag and stored at a web server.

11. A method of enhancing information retrieval in an information retrieval system, comprising:

a. generating a master term list of non-predetermined terms used in queries received from a client by the information retrieval system over a first period of time;
b. generating a new term list of terms used in queries received by the information retrieval system during a later period of time which are not in the master term list; and
c. adding, to documents stored at a web server containing the terms, the master term list and the new term list as a meta-tag.

12. The method of claim 11 in which at least one term selected from terms from said master term list is used to identify documents or files containing said term to which said term may be added as a meta-tag.

13. The method of claim 12 in which said new term database is used to identify documents or Files containing said term to which said term may be added as a meta-tag.

14. The method of claim 11 in which at least one term selected from terms from said master term list is used to identify only documents or files containing said term which have been created or modified since the last time the master term list was used to identify documents or Files, to which said term may be added as a meta-tag.

15. A method of enhancing information retrieval in an information retrieval system, comprising:
a. sorting non-predetermined query terms, received from a client and presented to the information retrieval system, by frequency of occurrence to provide a term list;
b. eliminating noise words and stop words from the term list;
c. selecting a portion of the term list containing the highest frequency terms;
d. processing the highest frequency terms as candidates for inclusion in documents or files containing the terms as a meta-tag and stored at a web server; and
e. adding the candidates to the documents or files containing the terms as a meta-tag.

16. A method of assisting a user in indexing a document created by the user, comprising:
a. extracting non-predetermined terms used in search queries received from a client and presented to a search engine on a website over a period of time;
b. presenting the extracted terms to the user;
c. receiving a user selection of terms using a browser; and
d. adding the received terms to a document to be searched as a meta-tag and stored at a web server.

17. A method of enhancing information retrieval in a system containing stored documents, comprising:
a. identifying a stored document stored at a web server containing a non-predetermined term received from a client;
b. determining if the stored document contains subject matter related to the term; and
c. selectively adding the term to the document containing subject matter related to the term as a meta-tag.

18. A method of operating an information retrieval system, comprising the steps of:

a. extracting non-predetermined terms used in search queries received from a client over a period of time;
b. identifying documents or files containing at least one of said terms and stored at a web server; and
c. selectively adding said at least one of said terms to documents or files containing at least one of said terms as a meta-tag.

19. The method of claim 18 in which said meta-tag is given more weight than other terms when ranking relevance of documents retrieved in response to a search query.

20. A computer program product, comprising:
a. a memory medium; and
b. a computer program stored on the memory, medium, the computer program comprising instructions for storing a list of non-predetermined terms used in queries together with frequency of occurrence and received from a client, and for adding at least one term selected from the list based on frequency of occurrence to at least one document containing the term as a meta-tag and stored at a web server.

21. A computer program product, comprising:
a. a memory medium; and
b. a computer program stored on the memory medium, the computer program comprising instructions for generating a master term list of non-predetermined terms used in queries received from a client by an information retrieval system over a period of time, for generating a new term list of terms used in queries received by the information retrieval system during a later period of time which are not in the master term list, and adding the master term list and the new term list as a source of terms to documents containing the terms as a meta-tag and stored at a web server.

22. A computer program product, comprising:
a. a memory medium; and
b. a computer program stored on the memory, medium, the computer program comprising instructions for extracting non-predetermined terms used in search queries received from a client and presented to a search engine on a website over a period of time, for presenting the extracted terms to the user, for receiving a user selection of terms, and for adding the received terms to a document to be searched as a meta-tag and stored at a web server.

23. A computer program product, comprising:
a. a memory medium located in a web server; and
b. a computer program stored on the memory medium, said computer program comprising instructions for extracting non-predetermined terms used in search queries by received from a client over a period of time, for identifying documents or files containing at least one of the terms and for selectively adding said at least one of the terms to said documents or files containing the at least one of the terms as a meta-tag.

* * * * *